US010033784B2

(12) United States Patent
Kaplinger et al.

(10) Patent No.: US 10,033,784 B2
(45) Date of Patent: Jul. 24, 2018

(54) PREDICTIVE MANAGEMENT OF OFFLINE STORAGE CONTENT FOR MOBILE APPLICATIONS AND OPTIMIZED NETWORK USAGE FOR MOBILE DEVICES

(71) Applicant: International Business Machines Corporation, Armonk, NY (US)

(72) Inventors: Todd E Kaplinger, Raleigh, NC (US); Alexandre Polozoff, Bloomington, IL (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 14/330,697

(22) Filed: Jul. 14, 2014

(65) Prior Publication Data
US 2016/0014194 A1 Jan. 14, 2016

(51) Int. Cl.
*H04L 29/06* (2006.01)
*H04L 29/08* (2006.01)

(52) U.S. Cl.
CPC .............. *H04L 65/60* (2013.01); *H04L 67/06* (2013.01); *H04L 67/1097* (2013.01); *H04L 67/18* (2013.01); *H04L 67/325* (2013.01)

(58) Field of Classification Search
CPC ..... H04L 65/60; H04L 67/1097; H04L 67/06; H04L 67/18
See application file for complete search history.

(56) References Cited

U.S. PATENT DOCUMENTS

| 5,815,662 A | 9/1998 | Ong | |
|---|---|---|---|
| 9,414,222 B1 * | 8/2016 | Dixon | .................... H04L 67/00 |
| 2007/0041344 A1 * | 2/2007 | Yaqub | ................ H04W 36/005 370/331 |
| 2007/0244986 A1 * | 10/2007 | Svendsen | ............ G11B 27/034 709/217 |
| 2008/0086750 A1 * | 4/2008 | Yasrebi | ............ H04L 29/06027 725/86 |

(Continued)

OTHER PUBLICATIONS iSub Music Streamer, by Datastart Consulting Services, Inc., http://itunes.apple.com/in/app/isub-music-streamer/id362920532?mt=8, pp. 1-3, last printed Jan. 17, 2014.

*Primary Examiner* — Nicholas R Taylor
*Assistant Examiner* — Tania M Pena-Santana
(74) *Attorney, Agent, or Firm* — Scully, Scott, Murphy & Presser, P.C.; Richard Wilhelm, Esq.

(57) ABSTRACT

There are provided a system, a method and a computer program product for controlling one or more media files in a mobile device. The system predicts a future usage of the media files. The system ranks each media file according to a likelihood that the each media file is processed at a time and a location associated with the predicted future usages. The system preemptively downloads the media files to a local data storage device of the mobile device, according to the ranking. There are also provided a system, a method and a computer program product for using one or more networks for a mobile device. The mobile device downloads an amount of data while the mobile device is connected to the first pre-determined wireless network. The mobile device configures certain applications in the mobile device to use the second pre-determined wireless network.

8 Claims, 6 Drawing Sheets

(56) References Cited

U.S. PATENT DOCUMENTS

| | | | |
|---|---|---|---|
| 2008/0307107 A1* | 12/2008 | Chen | H04N 7/17318 |
| | | | 709/231 |
| 2010/0184440 A1* | 7/2010 | Mao | H04W 48/18 |
| | | | 455/437 |
| 2012/0259919 A1* | 10/2012 | Yan | G06Q 30/02 |
| | | | 709/204 |
| 2013/0229976 A1* | 9/2013 | Srinivasan | H04W 36/18 |
| | | | 370/315 |
| 2014/0011538 A1 | 1/2014 | Mulcahy et al. | |
| 2014/0067997 A1* | 3/2014 | Saabas | H04L 47/22 |
| | | | 709/217 |

* cited by examiner

PREDICTIVE MANAGEMENT OF OFFLINE STORAGE CONTENT FOR MOBILE APPLICATIONS AND OPTIMIZED NETWORK USAGE FOR MOBILE DEVICES

BACKGROUND

This disclosure relates to managing downloading of data into a mobile device and particularly to preemptively downloading data to a mobile device for optimized network usages.

BACKGROUND OF THE INVENTION

There is an abundance of media streaming services for mobile devices that leverage cellular data networks. For example, media data can be streamed via a cloud computing service(s), for example, Amazon® Cloudplayer®, Grooveshark®, Spotify®, Pandora®, Last.FM®, etc. Each of these services provides media data to a mobile device on demand over a network connection. Some cloud computing services enable the user to specify playlists while others offer Internet radio services. Regardless of a wireless communication service type, there exists a cost of using these services via one or more wireless communication network(s). For example, when commuting to work, a user may only have a constant coverage by 3G ($3^{rd}$ generation) or 4G ($4^{th}$ generation) cellular data wireless network. However, a provider of this cellular data wireless network may charge the user for every byte downloaded to the mobile device. However, the user may encounter various lower cost wireless network(s) (e.g., WiFi network, etc.) when commuting to work. For example, the user may stop to get a cup of coffee or breakfast at a restaurant that offers a free WiFi connection to customers.

SUMMARY

There are provided a system, a method and a computer program product for controlling one or more media files in a mobile device. The system predicts a future usage of the media files. The system ranks each media file according to a likelihood that the each media file is processed at a time and a location associated with the predicted future usages. The system preemptively downloads the media files to a local data storage device of the mobile device, according to the ranking, and in order to satisfy a pre-determined time duration. The system processes, by the mobile device, the preemptively downloaded media file at the time and the location associated with the predicted future usage.

There is provided a method for controlling one or more media files in a mobile device. The method comprises: predicting a future usage of the media files; ranking each media file according to a likelihood that the each media file is processed at a time and a location associated with the predicted future usages; preemptively downloading the media files to a local data storage device of the mobile device according to the ranking, and in order to satisfy a pre-determined time duration; and processing, by the mobile device, the preemptively downloaded media file at the time and the location associated with the predicted future usage.

There is provided a computer program product for controlling one or more media files in a mobile device. The computer program product comprises a computer readable storage medium. The computer readable storage medium excludes a propagating signal. The computer readable storage medium is readable by a processing circuit and stores instructions run by the processing circuit for performing a method. The method comprises predicting a future usage of the media files; ranking each media file according to a likelihood that the each media file is processed at a time and a location associated with the predicted future usages; preemptively downloading the media files to a local data storage device of the mobile device, according to the ranking, and in order to satisfy a pre-determined time duration; and processing, by the mobile device, the preemptively downloaded media file at the time and the location associated with the predicted future usage.

There are provided a system, a method and a computer program product for using one or more networks for a mobile device. The mobile device obtains data associated with networks to which the mobile device has had an access. The mobile device creates, based on the obtained data, an historic mobile device data usage table. The mobile device connects to a first pre-determined wireless network. The mobile device determines, based on the mobile device historic data usage table an amount of data to be downloaded while the mobile device is connected to the first pre-determined wireless network. The mobile device downloads the determined amount of data while the mobile device is connected to the first pre-determined wireless network. The mobile device leaves the first pre-determined wireless network and enters a second pre-determined wireless network. The mobile device configures certain applications in the mobile device to use the second pre-determined wireless network. The mobile device configures other applications in the mobile device to prevent from being connected to the second pre-determined wireless network to thereby optimize network usage for the mobile device.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

There are provided a method, a system and a computer program product to preemptively download streaming media data (or media file(s)) to a local data storage device of a mobile device based on predicted future usage of the media data. The prediction of the future usage of the media data is based on one or more of: (1) history of user's past media data usage (across multiple mobile devices); or (2)

records of processing the media data by the user's social network contacts. Past pattern of media data usage may be the same or similar to future pattern of same or similar media data usage. The mobile device initiates a background process in a range of a first pre-determined network which is preferably a low-cost communications network (e.g., WiFi network, etc.). The initiated background process performs the preemptive downloading of the media files. The mobile device makes the preemptively downloaded media files be available for consumption or playback during a time when only a second pre-determined network (e.g., $3^{rd}$ generation, $4^{th}$ generation or $5^{th}$ generation wireless network, etc.) is available. Thus, the amount of media data preemptively downloaded is sufficient for consumption while transitioning to a next destination or to a location where another low-cost network connection is available thereby optimizing network usage costs.

Figure 3:
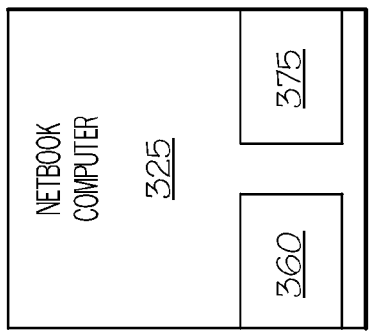
FIG. 3 illustrates hardware configuration examples for running the methods shown in FIGS. 1-2 and 4 in one embodiment.
Figure 3:
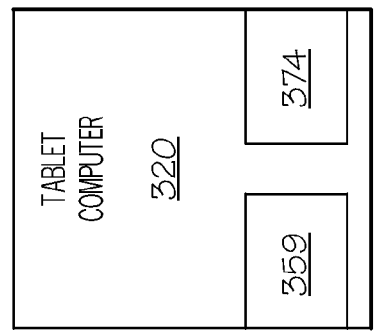
Figure 3:
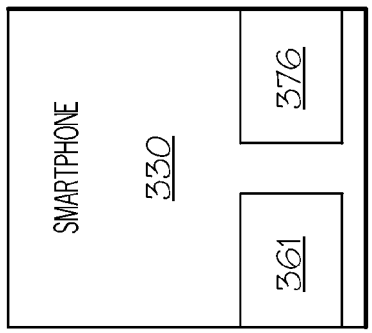
Figure 3:
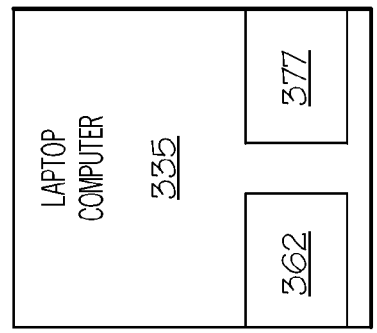
Figure 3:
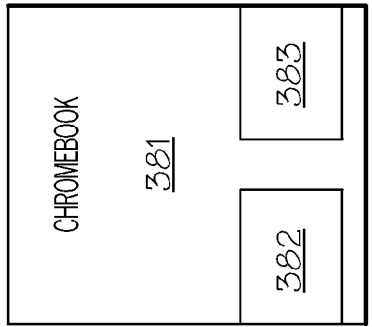
Figure 3:
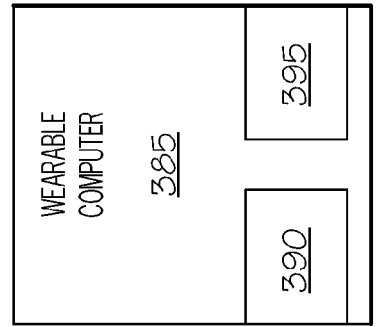

FIG. 3 illustrates examples of the types of mobile devices that can be programmed and configured with applications running the methods described herein. Examples of the mobile device may include, but are not limited to: a tablet computer 320 including at least one processor 359 and at least one memory device 374, a netbook computer 325 including at least one processor 360 and at least one memory device 375, a smartphone 330 including at least one processor 361 and at least one memory device 376, a laptop computer 335 including at least one processor 362 and at least one memory device 377, a chromebook 381 including at least one processor 382 and at least one memory device 383, or a wearable computer 385, e.g., smartwatch, etc., including at least one processor 390 and at least one memory device 395.

In one embodiment, the mobile device runs a method for determining a download frequency and an amount of media files to be downloaded, e.g., music files according to the mobile device user's music listening pattern, etc. The mobile device deletes media files based on a data storage pattern in the local data storage device (e.g., the memory device 361 shown in FIG. 3, etc.) of the mobile device.

The mobile device further runs a method for predicting a user's subsequent media file usage activity using a time correlated historic usage analysis table. In this embodiment, the mobile device preemptively downloads and stores media files (e.g., a playlist comprising music files, etc.) based on the prediction for subsequent processing (i.e., playback, consumption, etc.). The mobile device may be further configured for accessing one or more social networks, e.g., by automatically logging in the social networks by using valid credential of a user of the mobile device. Then, the mobile device utilizes data available in the social networks, e.g., shared tastes of the mobile device user's friends or a streaming media data that the user has positively endorsed (e.g., a new song), to predict a user's upcoming activity, i.e., a future usage of the user. If most of users in the social network(s) played a media file, the user of the mobile device is highly likely to play the media file. The mobile device may assign a specific data storage size to be used to store the preemptively downloaded media files which are to be processed (i.e., played; consumed) in the user's upcoming activity. A likely duration in transitioning to the upcoming activity (e.g. a time length that it takes to drive home from work) may be used to determine an amount of media files or data to be preemptively downloaded for playback before the mobile device enters a more costly pre-determined wireless network. Playtime of the preemptively downloaded media files may be similar or same to the duration of transitioning to the upcoming activity.

Figure 1:
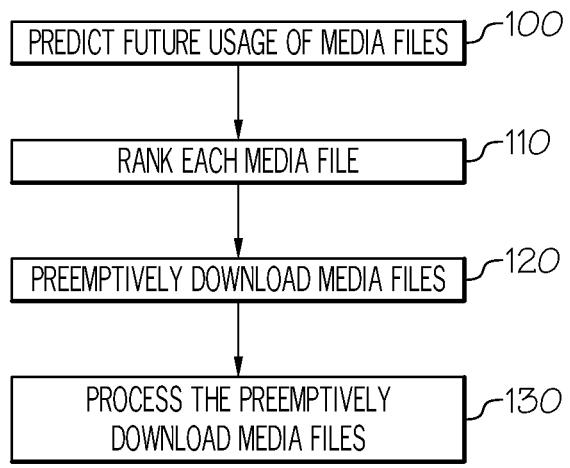
FIG. 1 illustrates a flowchart that describes method steps for controlling one or more media files in a mobile device in one embodiment.

FIG. 1 illustrates a flowchart that describes method steps for automatically controlling the preemptive downloading of one or more media files in a mobile device in one embodiment. At 100, a mobile device program (such as a program 611 run on a mobile device 610 shown in FIG. 6) is run to predict a future usage of the media files, e.g., based on history of user's past media data usage. Alternately, this process is run on another device, e.g., a home computer or network server to which a mobile device may interface. Prior media data usage pattern may be similar to or same as the future media data usage pattern. At 110, the mobile device program ranks each media file according to a likelihood that the each media file is processed at a time and a location associated with the predicted future usages. In order to rank the each media file, the mobile device may prioritize the each media file according to one or more of: an analysis of the each media file, a time of day in which the preemptively downloaded media file is to be processed (e.g., consumed), and a current location of the mobile device.

At 120, the mobile device preemptively downloads the each media file to a local data storage device of the mobile device according to the ranking, and in order to satisfy a pre-determined time duration. For example, the mobile device may first download a media file that has the highest priority. At 130, the mobile device processes the preemptively downloaded media file at the time and the location associated with the predicted future usage, e.g., the commute to work, or the commute back to home.

Figure 2:
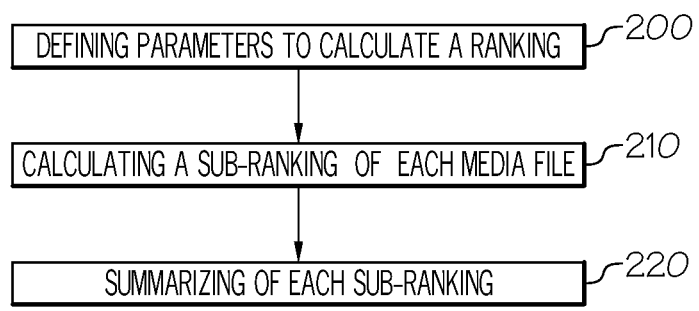
FIG. 2 illustrates a flowchart that describes method steps for ranking media files in one embodiment.

FIG. 2 illustrates a flowchart that describes method steps for ranking media files in one embodiment. R represents a ranking of a corresponding media file. A ranking of a zero value (0) represents a media file that is least likely to be consumed. At 200, the mobile device sets parameters to calculate the ranking of a media file. For example, the mobile device may define three parameters (or variables): (1) a variable M that represents a media file to be analyzed; (2) a variable T that represents a time of day during which usage of the preemptively downloaded media file is to be played; and (3) a variable L that represents a current location of the mobile device. The mobile device runs one or more analysis with those defined parameters to determine the ranking. For example, the mobile device calculates the ranking, e.g., by a summation of plural sub-rankings, $R_f$. In order to calculate $R_f$, the mobile device solves an equation $R_f=F\times(1/T_d)$, where $T_d$ is a time duration (delta) between an event E and a particular time T. The value F is a prioritized multiplication factor associated with the event E. This equation defines a ranking of the event E such that a recent event has more priority than an older event. An example event may be that "a user chooses to download a media file" and occurred on a specific date, e.g., November 23. The downloading of the media file may be assigned a multiplication factor of 10. If a target date (T) is November 25, the sub-ranking $R_f$ of this event may be calculated as: $10\times(1/(25-23))=5$.

The mobile device program 611 (FIG. 6) derives multiplication factors from a historical usage analysis. The past usage pattern of a media file is indicative of how that media file is likely be used in the future. Example multiplication factors include, but are not limited to: (1) if a user selected a particular media file, a multiplication factor of a corresponding event may be +10 (a positive number ten); (2) if a user selected a similar or related media file, a multiplication factor of a corresponding event may be +5 (a positive number five); (3) if a user skipped an particular media file, a multiplication factor of a corresponding event may be −5 (a negative number five); and (4) if a user skipped a similar or related media file, a multiplication factor of a corresponding event may be −3 (a negative number three).

In one embodiment, the mobile device program 611 derives multiplication factors by conducting a social network analysis. When available, the media file usage of user's contacts (e.g., Facebook® Friends, etc.) may reflect interests that are similar to an interest of that user of the mobile device. Example multiplication factors, which reflects the social network analysis, include, but are not limited to: (1) if a friend selected an exact media file, a multiplication factor of a corresponding event may be +5; (2) if a friend selected a similar or related media file, a multiplication factor of a corresponding event may be +3; (3) if a friend skipped an exact media file, a multiplication factor of a corresponding event may be −3; (4) if a friend skipped a similar or related media file, a multiplication factor of a corresponding event may be −2.

In one embodiment, the mobile device program 611 calculates a ranking of a media file, e.g., a summation of sub-rankings of events associated with the media file: $R = \Sigma (R_{f1}, R_{f2}, R_{f3}, \ldots, R_{fn})$. A R value of a media file is used to determine which media files to be stored in a local data storage device of a mobile device to target a given time of day. Thus, in one embodiment, the mobile device 610 (FIG. 6) may first download media file content with the highest R value into its local data storage device. The mobile device continuously downloads media files until a stop condition is encountered. The mobile device define the stop conditions as follows: (1) a data storage space allocated for preemptively storing media files is full; (2) the first pre-determined network connection is not available to the mobile device; and (3) a play time duration of media files is sufficient to satisfy a user's requirements, e.g., a time duration to arrive at a user's upcoming event.

At a given time of day, historical media usage patterns represents user's past media file consuming habits, e.g., when/what media file content that user typically consumes for a specific time duration. For example, the user's commute from work back to the home destination is typically 30 minutes. Based on the predicted future usage, the mobile device consumes the media files during the target time of day in a given usage window. Since the mobile device knows an average of the history playtime duration, the mobile device uses this knowledge of the history playtime usage to determine a size of the local data storage of the mobile device needed to preemptively download the content.

Analyzing a history media file usage pattern and data representing a location associated with the predicted future usage pattern, and available networks, the mobile device program 611 determines an estimated time of arrival at a second pre-determined network. The mobile device uses this estimated time of arrival to determine the amount of data that should be cached to prevent a user from requiring data retrieval while away from a preferred network. The estimated time of arrival may be similar or same to a cache data consumption rate of the mobile device. The mobile device dynamically manages preemptively downloading of media files to be used while the mobile device enters the second pre-determined network or while the mobile device is at the second pre-determined network.

The mobile device downloads data, e.g., media files 613 (FIG. 6), into its local data storage device 612 for its streaming-media application or its other type of application that interacts with a server device. When in the presence of a lower cost wireless network, e.g., a WiFi network 605, 655, it is preferable to use a lower cost wireless network connection in order to store data in the local data storage device of the mobile device and further to avoid or reduce having to download data and usage charged by a more costly cellar data network provider.

The mobile device downloads data into its local data storage device 612 when the mobile device is in a range of the first pre-determined network, i.e., the lower cost wireless network. Before moving out of the range from the first pre-determined network, the mobile device downloads enough data to its local data storage device to play the downloaded data, e.g., media files, etc., until the mobile device enters a range of a next lower cost wireless network. Upon arriving at the next lower cost wireless network, the mobile device re-fills the local data storage device, i.e., overwrites data in the local data storage device, with new data such that the mobile device may plays the new data until the mobile device reaches another lower cost wireless network.

The mobile device loads may load additional data into the local data storage device upon an arrival at the another lower cost wireless network.

In one embodiment, the mobile device may further access an electronic calendar to determine when data needs to be loaded into the local data storage device of the mobile device. For example, if the electronic calendar indicates that the user of the mobile device starts to work at an office from 9 AM until 5 PM, the mobile device may be configured to download data, e.g., media files, by using WiFi network available at the home, or, for the morning commute, and download data, e.g., media files, for the commute back home, from a wired or WiFi network available at the office. The mobile device prioritizes data to be downloaded, e.g., based on a usage history and of an amount sufficient for the commute time duration. The mobile device may further configure certain applications or certain data within those applications to access a high cost wireless network, e.g., 3G/4G/5G cellular data wireless network, while a lower cost wireless network is not available to the mobile device. The mobile device may allow, e.g., through a graphical user interface, etc., the user to control an amount of data to be downloaded via the cellular data wireless network, based on a remaining budget of a wireless data plan of the user.

In order to optimize both cost and performance of streaming of data in the mobile device, the mobile device utilizes a low cost and high bandwidth wireless connection, e.g., WiFi network connection, etc., when this network connection is available to the mobile device. In order to utilize the low cost and high bandwidth connections for preemptive downloading, the mobile device runs a method shown in FIGS. 4A-4C.

Figure 4A:
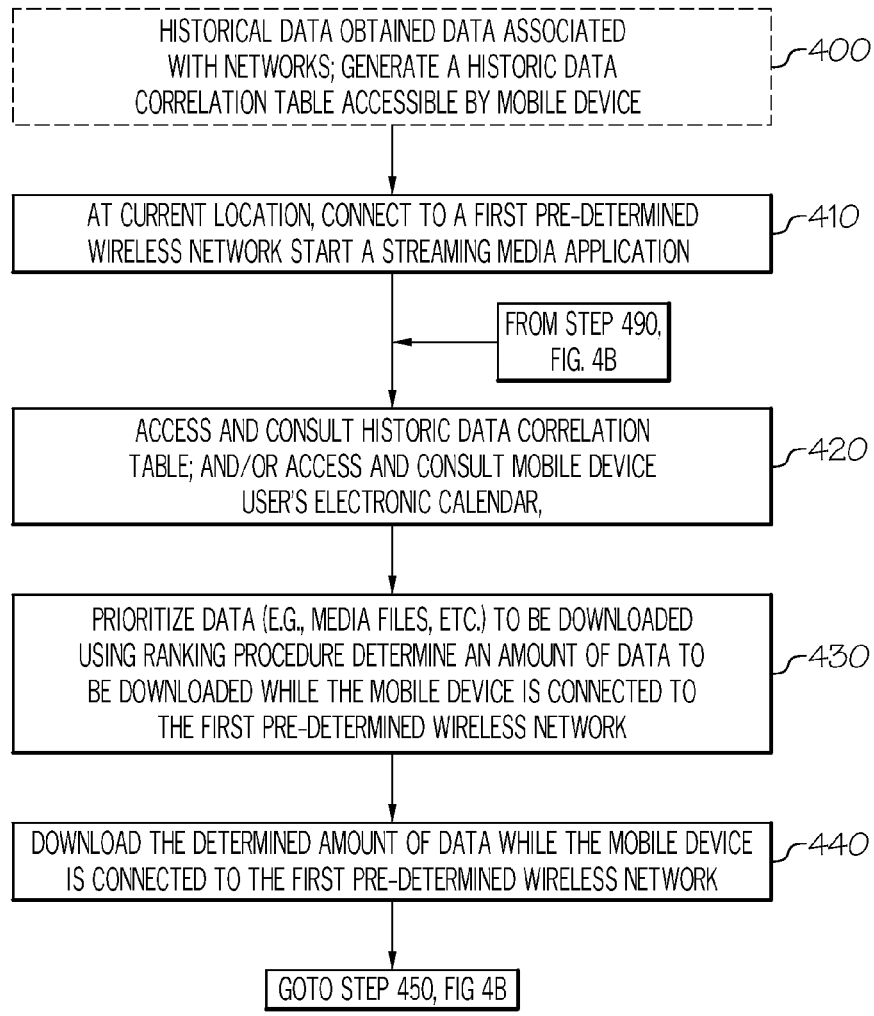
FIGS. 4A-4C illustrate a flowchart that describes a method for using one or more networks for a mobile device in one embodiment.

In FIG. 4A, at 400, the mobile device obtains over time, historic data associated with networks to which the mobile device has had a prior access/usages. A data table is generated having entries that correlates the historic data associated with networks to which the mobile device has had prior accesses/usages, and which table is stored on the mobile device. Thus in one example, the table includes entries showing different routes taken by the user to get to different destinations, e.g., commute to home or work, and provide a mapping to the types of networks encountered over the course of the route, e.g., a commute to work. At 400, the mobile device has been provided with and maintains the generated table whose entries correlate the obtained historic device usage data including, but not limited to: a network type; a cost needed to use a corresponding network; an average download speed (throughput) when using the corresponding network; a time of day that the mobile device accessed the corresponding network; a duration of a time that the mobile device is within a coverage of the corresponding network; and a physical location coordinate of the mobile device. This ensures a predictability so the device will know how much content to preemptively download and when for use while only a higher cost network is available. In one embodiment, the device determines an estimated time of arrival (ETA) until it expects to arrive at the next network location that it would want to use. The device will download enough data (e.g. aggregate minutes of audio data) to sustain the user's activity until the next waypoint is reached. The table enables the device to track and predict when it will likely see another network of various types.

At 410, while using a low cost and high bandwidth wireless connection, the mobile device may start to use a streaming-media application, e.g., a music playlist from Pandora®, or Last.FM®. The mobile device then is configured to access the historic data correlation table at 420. The mobile device determines a table entry that corresponds to a network connection that the streaming-media application is currently using and a current location. At 420, the mobile device program 611 may further access the user's electronic calendar software application available on the mobile device. At 430, based on entries in the electronic calendar, the mobile device determines when the mobile device is expected to leave the current connection to the low cost and high bandwidth wireless network. That is, the mobile device determines a duration during which the mobile device is being connected to the currently using network, e.g., a lower cost wireless network, etc., based on the electronic calendar entries. The electronic calendar entries may include, but are not limited to: a current location of the user who is using the mobile device; a particular duration or period of time for which the user, who uses the mobile device, is expected to stay at a current location, e.g., less than 30 minutes; a user's next destination; a network service connection(s) (and/or types of network connections) available at the destination; an event(s) that indicates a location(s) that the user will visit in a future, etc. The mobile device analyzes a network usage and/or user's activity (e.g., downloading of media files, etc.) whenever the mobile device uses a wireless network.

At 430, FIG. 4A, based on the next user's destination (e.g., a place) and the available network service connection at the destination, the mobile device program 611 (FIG. 6) employs the methods to prioritize data (e.g., media files, etc.) to be downloaded. In one embodiment, prioritizing may be based on the predicted offline storage procedures to calculate the ranking of data (e.g., media files, etc.), or is based on the data that is immediately needed by the user when transitioning to the next destination. Based on the current location of the user and the destination of the user, the mobile device calculates when the mobile device encounters a next lower cost wireless network. Returning to FIG. 4A, at 430, the mobile device determines, based on the table and the electronic calendar entries, an amount of the prioritized data (e.g. highest ranked data) to be downloaded while the mobile device is connected to the currently using network, e.g., a lower cost wireless network, etc. For example, the amount of data to be downloaded may be equal to an amount of data to be consumed by the user while the user travels from the current location to a next location at which the next lower cost wireless network is available to the user. At 440, the mobile device downloads the determined amount of data for off-line cache-storage while the mobile device is connected to the current lower cost wireless network. By downloading the determined amount of data through the current network, i.e., the lower cost wireless network, etc., the mobile device may minimize a chance to access a high cost wireless network, e.g., a cellular wireless data network.

Figure 4B:
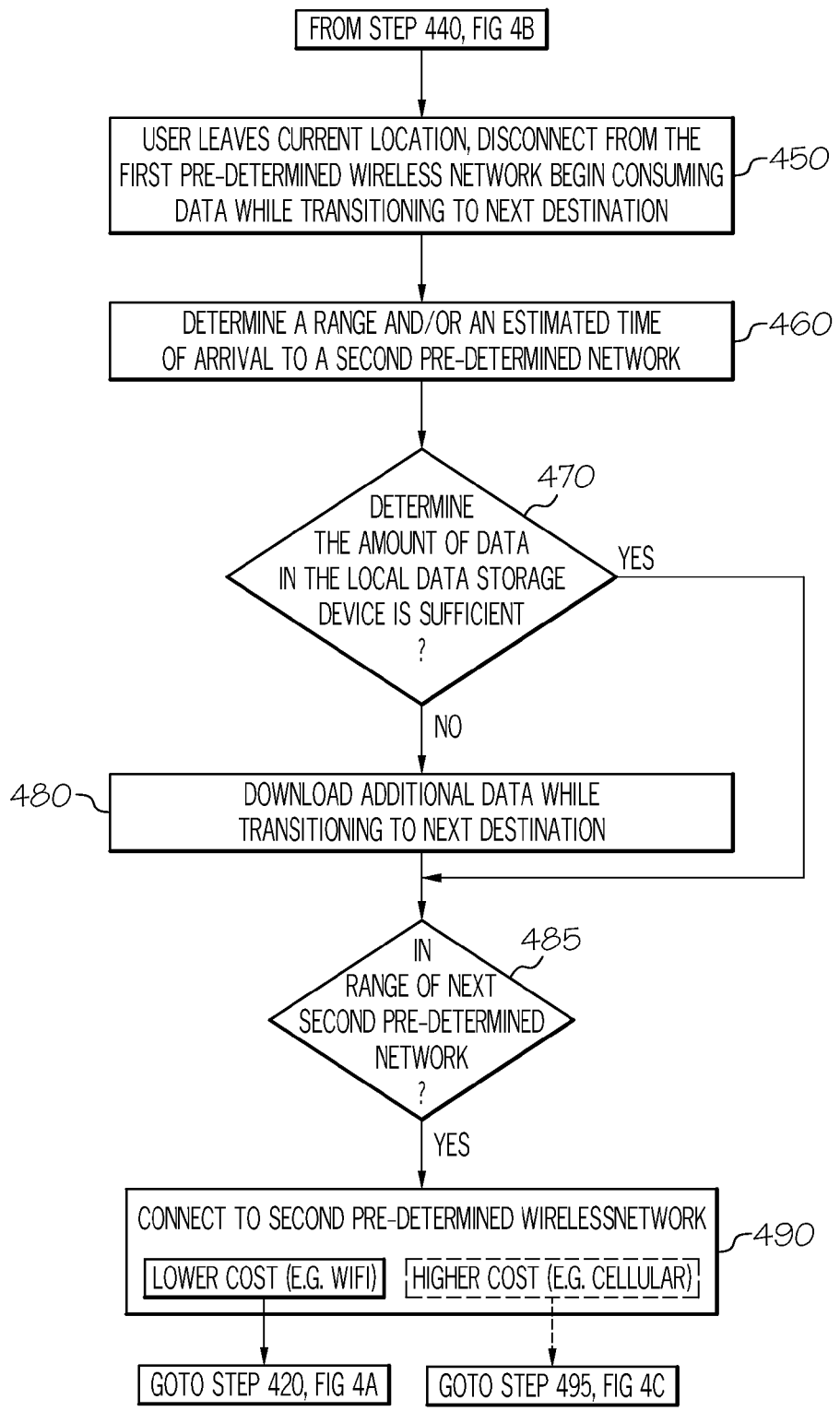

Referring to FIG. 4B, at 450, the user leaves current location and disconnects from the first pre-determined (current lower cost) wireless network. That mobile device may additionally begin consuming the downloaded data through the streaming-media application, e.g., while transitioning to next destination as determined by a calendar entry. Then, at 460, the mobile device uses its GPS (Global Positioning System) receiver location and employs logic or an algorithm to compute a range and/or determine an estimated time of arrival to a second pre-determined wireless network determined from the calendar entry. In one embodiment, based on the calendar entry, the second pre-determined wireless network may be a next lower cost wireless network. Based on the estimated time of arrival and the range of the next lower cost wireless network, the mobile device determines at 470 whether the amount of data in the local data storage device is sufficient to be provided to the streaming-media application while the user is traveling from the current location to the next destination. For example, the mobile device may compare an estimated remaining time period it would take to get to a range of the next lower cost wireless network, e.g., the second pre-determined wireless network. This estimated remaining time period may be compared against a data consumption rate value computed according to a relation:

$$\frac{an\,amount\,of\,unprocessed\,data \in the\,local\,data\,storage\,device}{a\,processing\,speed\,of\,the\,streaming-media\,application}$$

If, at 470, the mobile device determines, based on an expected duration(s) and amount of unprocessed data, that there exists insufficient unprocessed data in the local data storage device, at 480, the mobile device may download additional data that would be enough to be consumed by the streaming-media application until the mobile device reaches the range of the next lower cost wireless network. In this instance, with knowledge of the processed state and/or metadata of the consumed media files already downloaded, the application may use an available cellular (or higher cost) wireless data network in order to download additional data for the program. Then, the method proceeds to step 485. Otherwise, at 470, if the mobile device determines, based on an expected duration(s) and amount of unprocessed data, that there is sufficient unprocessed data in the local data storage device, the method continues to step 485. At step 485, a determination is made whether the mobile device has become within range of or arrived at the next destination. If determined within range or arrived at the next destination, the mobile device at 490 may then connect to the second pre-determined wireless network, e.g., a next lower cost wireless network. Upon connecting to the next lower cost wireless network, the mobile device returns its control to the step 420, FIG. 4A.

Returning to step 460, in a further embodiment, the second pre-determined network may not be a lower cost wireless network, but a higher cost wireless network; e.g., 3G/4G/5G cellular wireless data network, a roaming service of a cellular wireless network). If only such higher cost network is available, then the mobile device alternatively connects to this higher cost network at 490, and the process may proceed to step 495, FIG. 4C where the mobile device configures only certain applications in the mobile device to use the higher cost wireless network. The mobile device may further configure at 497 other applications in the mobile device to prevent from being connected to the high cost wireless network. Alternatively, a graphical user interface (not shown) of a "setting" feature of the mobile device may allow the user of the mobile device to select one or more applications to connect to the high cost wireless network. For example, the user may configure the mobile device to upload and/or download only certain data, e.g., an email having a priority and/or an email including an urgent word or symbol, associated with specific applications while the mobile device is in range of the high cost wireless network. It is understood that if there is insufficient data in offline storage at step 480, FIG. 4B, and such a higher cost network may be used, then steps 495-497 may be implemented while traveling or transitioning to the next destination.

The mobile device may further periodically evaluate a remaining cellular data budget left in user's data plan. Based on this evaluation, the user may select one or more application(s) to use the data plan for the rest of a corresponding billing cycle while preventing other applications from using the data plan for the rest of the billing cycle. For example, assume that the user is on a data plan which allows the user to download and/or upload up to 300 MByte. If the user already used 200 MByte while only 30% of a corresponding billing cycle is passed, the user may configure, e.g., by using the graphical user interface of the "setting" feature of the mobile device, one or more applications to use a cellular wireless data network and prevent other applications from using the cellular wireless data network. The mobile device may not allow the user or any application in the mobile device to access the cellular wireless data network upon a data usage of the mobile device reaches 95% of 300 MByte of the data plan.

Figure 6:
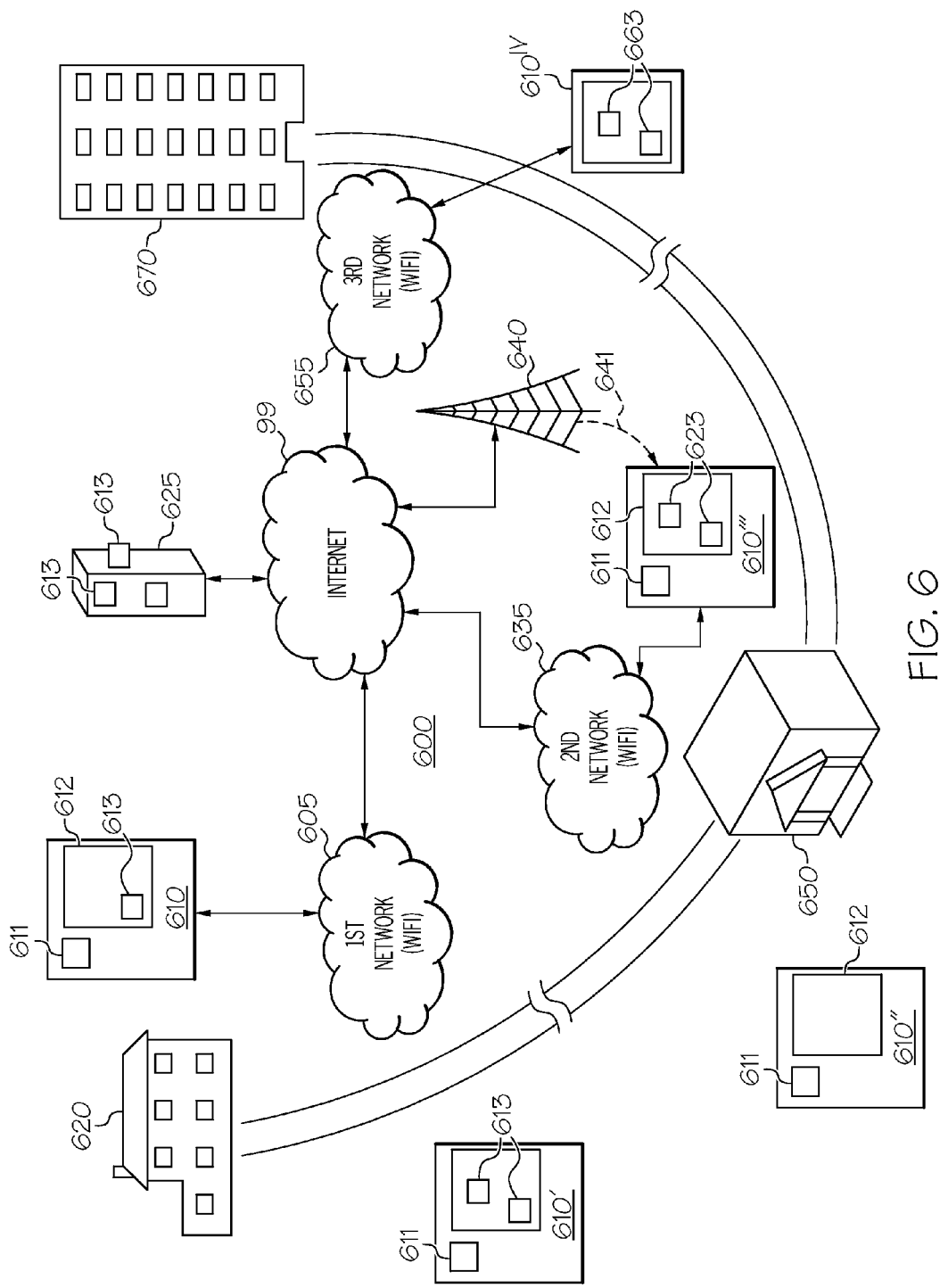
FIG. 6 illustrates an example environment showing the mobile device employing the methods described herein and example connections via one or more low-cost networks in one embodiment.

FIG. 6 illustrates an example environment 600 showing the mobile device employing the methods described herein and example connections via one or more low-cost networks. The mobile device's processor and memory is configured to run the program 611 for effecting functionality of the methods described herein. The mobile device 610 also includes a local memory storage device, e.g., cache 612, for storing media file content for playback. In this example environment 600, a mobile device such as a smartphone device 610 is shown in various states. For example in an initial or $0^{th}$ state, mobile device 610 is depicted at an initial location, e.g., a mobile device owner's home 620. From consulting an electronic calendar, and from historic usage patterns, and employing ranking and or social media contacts, the mobile device 610 is preemptively downloading data or a set of media file content 613, e.g., digital music files, from a media content server 625 via the internet 99 and a local low-cost, local wired or wireless network connection such as the user's home Wi-Fi network 605 depending upon an upcoming activity (i.e., commute to work). In one embodiment, the preemptively downloaded media files 613 may be first downloaded to another off-line data storage device such as a computer memory or hard disk drive associated with the user's home desktop or laptop computer (not shown) which may then be transferred to the local mobile device memory 612.

In the example scenario depicted in FIG. 6, in a first state, during the morning commute to a work destination 670, the mobile device 610' may listen to the downloaded digital music files of playlist. This playlist includes media content 613 preemptively downloaded from the content server 625 via the home WiFi network 605. The mobile device, while in this first state commuting on a route to a next destination such as an office 670, processes (i.e., plays; consumes, etc.) the preemptively downloaded media files 613. Alternatively, the mobile device may just play back the preemptively downloaded data content while at the destination or while performing a next activity. In this manner, the mobile device does not have to access and download the same contents from a higher cost network, during the travel or transition to the user's next destination/activity.

However, in a fourth mobile device state, for the evening commute back home, the user may listen to a different music playlist. Thus, similarly, once the user is at a next location, e.g., work or office 670, the set of those media files 613 is automatically overwritten, and a new set of media files 663, which are likely to be consumed on the user's evening commute back to the home location 620, are preemptively downloaded. In one embodiment, the new media files 663 may be first downloaded to another off-line memory storage device such as a computer memory or hard disk drive associated with the user's office desktop or laptop computer (not shown) which files may then be transferred to the mobile device $610^{IV}$ as shown in FIG. 6. Alternatively, the mobile device $610^{IV}$ may download the new media files 663 directly to its memory storage device 612 via a low-cost office W-iFi connection as depicted as $3^{rd}$ Wi-fi network 655 at the office for playback or consumption during the commute back to home location or another destination. In this manner, the mobile device does not have to access and download the same contents from a higher cost network, during the travel or transition to the next destination.

Figure 4C:
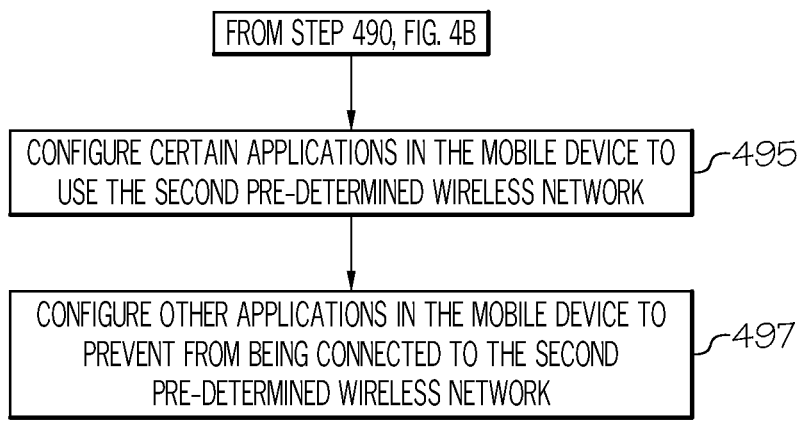

Thus, in the manner as described in FIGS. 4A-4C there is orchestrated the loading of data into offline storage based on estimated arrival at a preferred low cost network that includes the ability to cross reference an electronic calendar to determine when data needs to be loaded into offline storage. The data to be loaded for usage may be prioritized if the user is only connected to the low cost network for a very short time.

This is illustrated, for example in FIG. 6 where, for example, the mobile device indicated as 610' is traveling form home 620 to work destination 670 with media files 613 being played. In this scenario, the calendar or historic data usage patterns reveals that the user usually stops, for example, or passes by a coffee shop, indicated as destination 650, to grab a coffee on the way to work. As shown, it is conceivable that media file content 613 could be used up or that just enough content was preemptively stored and all preemptively stored contents consumed (played back) during the duration of the commute to the coffee shop 650. The same mobile device 610'' is thus in a second state showing no or insufficient amount of media content in its memory 612. At this state, the mobile device 610'' may thus be programmed based on historic usage table, or electronic calendar entry, to download further media file content 623 using a free or low cost $2^{nd}$ network network 635, e.g., a Wi-Fi. network available at the coffee shop 650. The mobile device is thus rendered in a third state 610'''. Even if the user does not stop at the location 650, the mobile device is programmed to automatically detect a Wi-fi signal and may initiate a download of pre-determined media file content 623 while the free Wi-fi connection is within range for a pre-determined amount of time as indicated from an entry in the historic usage correlation table. Thus, when leaving the coffee shop on route to the final work destination, in the third state mobile device 610''' is shown to have further preemptively stored further media file content 623 for playback while transitioning to the user's work location. It is noted that, if on route, there is no free or low cost $2^{nd}$ network network 635 available on a particular day, the mobile device

610''' may alternatively dynamically access the media content service for downloading the media content needed for the remaining leg of the morning commute to work (from the coffee shop 650 to the office 670) via a higher cost cellular network download represented by the broken arrow 641 from cellular communications network base station 640. Additionally, in the method 611 employed by the device, there is provided the ability to dynamically configure certain applications or certain data within the applications to be used at the high cost (e.g., cellular) network while low cost network isn't available. Thus, users are enabled to intelligently optimize cellular data usage for their remaining data plan.

Figure 5:
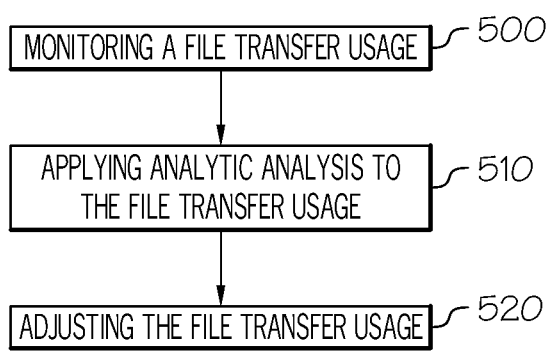
FIG. 5 illustrates a flowchart that describes a method for reducing a file transfer usage in one embodiment.

FIG. 5 illustrates a flowchart summarizing the method for reducing a file transfer usage in one embodiment. At 500, the mobile device monitors a file transfer usage by a user of the mobile device, e.g., by using software application, installed on the mobile device, which is intended to monitor data usage including the file transfer usage. At 510, the mobile device applies an analytic analysis to the file transfer usage to identify patterns of the file transfer usage. The analytic analysis includes, but is not limited to: applying data analysis on numerical factors of the file transfer usage. The factors include, but are not limited to: a time, a location, a download or upload speed, a wireless network usage, a social network that the user has accessed, a data memory storage space, a frequency of file transfers, etc. At 520, responsive to the identified patterns of the file transfer usage, the mobile device adjusts the file transfer usage and data memory storage requirements according to a cost saving criteria. The cost saving criteria includes, but is not limited to: avoiding overcharges based on a wireless network usage. The mobile device further calculates probabilities that the user accesses files at times and locations based on historical file access records, which may be stored in a local data storage device in the mobile device. The mobile device optimizes accesses to the files, e.g., by preemptively downloading media files to a local data storage device of the mobile device while the mobile device is being connected to WiFi network, etc. and further according to a cost saving criteria. Mobile devices may exchanges files directly or indirectly via one or more local wireless network, e.g., WiFi network.

In one embodiment, the methods shown in FIGS. 1-2 and 4-5 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1-2 and 4-5 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for controlling one or more media files in a mobile device of a user, the method comprising:
    predicting a future usage of the media files at said mobile device, said predicting based on a history or pattern of the user's past media files usage, a future usage including a time of day in which the preemptively downloaded media file is to be processed and a pre-determined time duration for consuming said media file at said mobile device;
    ranking each media file according to a likelihood that the each media file is to be consumed at a time and a location associated with the predicted future usage, said ranking comprising:
        for each media file that predicts subsequent media file usage activity of the user:
            computing one or more sub-rankings of events ($R_f$) associated with the media file, at least one sub-ranking computed according to:

$R_f = F \times (1/T_d)$, where $T_d$ is a time duration between an event and a target time at which said media file is to be consumed and F is a multiplication factor of the corresponding event assigned based on said history or pattern of the user's social media contact's past media files usage; and
            conducting a social media analysis of the user's social media contacts, wherein an assigned multiplication factor is a value based on events relating to a user's social media contact's usage of the media file, said events comprising: a user's social media contact selecting an exact media file as the user or selecting a similar media file as the user, or the user's social media contact not selecting the exact media file as the user or not selecting a similar media file as the user; and
            summing said one or more computed sub-rankings of events associated with the media file to obtain a ranking value;
    preemptively downloading the media files to a local data storage device of the mobile device according to the ranking value, said media file being downloaded via a wireless WiFi communications network connection for storage at said mobile device, an amount of media files downloaded via said WiFi connection to the local data storage device of the mobile device to satisfy the pre-determined time duration associated with the predicted future usage; and
    consuming, by the mobile device, the preemptively downloaded media file at the time in which the preemptively downloaded media file is to be processed and the current location of the mobile device associated with the predicted future usage, said mobile device not connected to said wireless WiFi network while consuming said media file during said pre-determined time duration.

2. The method according to claim 1, wherein the predicting is further based on one or more of:
    records of consuming media files by the user's social network contacts.

3. The method according to claim 1, wherein the preemptively downloading comprises:
    initiating a background process, in the mobile device, in a range of a first pre-determined network, the initiated background process performing the downloading the media files into the local data storage.

4. The method according to claim 1, wherein the processing comprises:
    making the preemptively downloaded media files be available for consumption when the mobile device enters a second pre-determined network, said second pre-determined network type a higher usage cost network.

5. A system for controlling one or more media files in a mobile device of a user, the system comprising:
    a memory device;
    a processor connected to the memory device,
    wherein the processor is configured to perform:
    predicting a future usage of the media files, said predicting based on a history or pattern of the user's past media files usage, a future usage including a time of day in which the preemptively downloaded media file is to be processed and a pre-determined time duration for consuming said media file at said mobile device;

ranking each media file according to a likelihood that the each media file is to be consumed at a time and a location associated with the predicted future usage, said ranking comprising:

for each media file that predicts subsequent media file usage activity of the user:

computing one or more sub-rankings of events ($R_f$) associated with the media file, at least one sub-ranking computed according to:

$R_f = F \times (1/T_d)$, where $T_d$ is a time duration between an event and a target time at which said media file is to be consumed and F is a multiplication factor of the corresponding event assigned based on said history or pattern of the user's social media contact's past media files usage; and conducting a social media analysis of the user's social media contacts, wherein an assigned multiplication factor is a value based on events relating to a user's social media contact's usage of the media file, said events comprising: a user's social media contact selecting an exact media file as the user or selecting a similar media file as the user, or the user's social media contact not selecting the exact media file as the user or not selecting a similar media file as the user; and summing said one or more computed sub-rankings of events associated with the media file to obtain a ranking value;

preemptively downloading the media files to a local data storage device of the mobile device according to the ranking value, said media file being downloaded via a wireless WiFi communications network connection for storage at said mobile device, an amount of media files downloaded via said WiFi connection to the local data storage device of the mobile device to satisfy the pre-determined time duration associated with the predicted future usage; and consuming, by the mobile device, the preemptively downloaded media file at the time and the location associated with the predicted future usage, said mobile device not connected to said wireless WiFi network while consuming said media file during said pre-determined time duration.

6. The system according to claim 5, wherein the predicting is further based on:

records of consuming media files by the user's social network contacts.

7. The system according to claim 5, wherein the processor is configured to: make the preemptively downloaded media files be available for consumption when the mobile device enters a second pre-determined network, said second pre-determined network type a higher usage cost network.

8. A computer program product for controlling one or more media files in a mobile device of a user, the computer program product comprising a computer readable storage medium, the computer readable storage medium excluding a propagating signal, the computer readable storage medium readable by a processing circuit and storing instructions run by the processing circuit for performing a method, said method comprising:

predicting a future usage of the media files, said predicting based on a history or pattern of the user's past media files usage, a future usage including a time of day in which the preemptively downloaded media file is to be processed and a pre-determined time duration for consuming said media file at said mobile device;

ranking each media file according to a likelihood that the each media file is to be consumed at a time and a location associated with the predicted future usage, said ranking comprising:

for each media file that predicts subsequent media file usage activity of the user:

computing one or more sub-rankings of events ($R_f$) associated with the media file, at least one sub-ranking computed according to:

$R_f = F \times (1/T_d)$, where $T_d$ is a time duration between an event and a target time at which said media file is to be consumed and F is a multiplication factor of the corresponding event assigned based on said history or pattern of the user's social media contact's past media files usage; and conducting a social media analysis of the user's social media contacts, wherein an assigned multiplication factor is a value based on events relating to a user's social media contact's usage of the media file, said events comprising: a user's social media contact selecting an exact media file as the user or selecting a similar media file as the user, or the user's social media contact not selecting the exact media file as the user or not selecting a similar media file as the user; and summing said one or more computed sub-rankings of events associated with the media file to obtain a ranking value;

preemptively downloading the media files to a local data storage device of the mobile device according to the ranking value, said media file being downloaded via a wireless WiFi communications network connection for storage at said mobile device, wherein an amount of media files is preemptively downloaded to a local data storage device of the mobile device to satisfy the pre-determined time duration associated with the predicted future usage.

* * * * *